L. F. FULLER.
ELECTRICAL OSCILLATION GENERATOR.
APPLICATION FILED JULY 12, 1916.
1,298,490.
Patented Mar. 25, 1919.
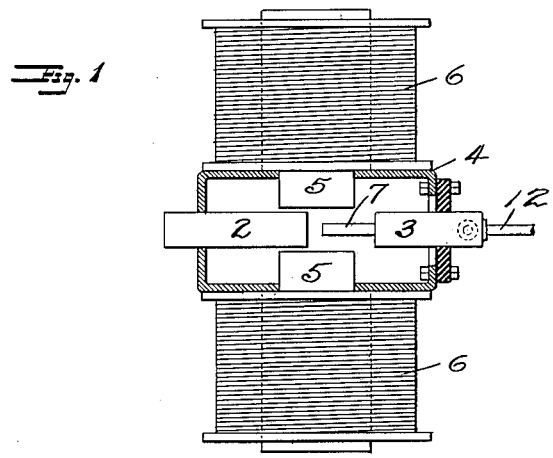
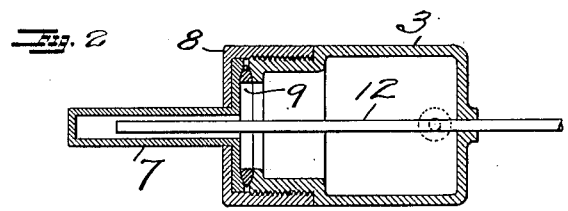
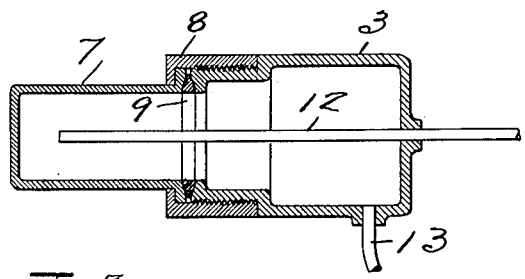
WITNESSES:
J. B. Gardner
INVENTOR.
L. F. FULLER
BY White & Prost
HIS ATTORNEYS.

UNITED STATES PATENT OFFICE.

LEONARD F. FULLER, OF SAN FRANCISCO, CALIFORNIA, ASSIGNOR TO FEDERAL TELEGRAPH COMPANY, OF SAN FRANCISCO, CALIFORNIA, A CORPORATION OF CALIFORNIA.

ELECTRICAL-OSCILLATION GENERATOR.

1,298,490.      Specification of Letters Patent.      Patented Mar. 25, 1919.

Application filed July 12, 1916. Serial No. 108,846.

*To all whom it may concern:*

Be it known that I, LEONARD F. FULLER, a citizen of the United States, and a resident of the city and county of San Francisco, State of California, have invented a certain new and useful Electrical-Oscillation Generator, of which the following is a specification.

The invention relates to generators of electrical oscillations for the purpose of radio communication, and relates particularly to a generator of the Poulsen type, in which an arc is produced in an atmosphere of hydrogen.

An object of the invention is to provide an arc generator which has a large power output in proportion to its size.

Another object of the invention is to reduce to a minimum the amount of copper and iron in the magnetic circuit.

The invention possesses other advantageous features, which, with the foregoing, will be set forth at length in the following description where I shall outline in full that form of the invention which I have selected for illustration in the drawings accompanying and forming part of the present specification. In said drawings I have shown one specific form of my invention, but it is to be understood that I do not limit myself to such form, since I may adopt many variations thereof within the scope of my invention as set forth in the claims.

Referring to said drawings:

Figure 1 is a horizontal section partly diagrammatic, of the generator of my invention.

Fig. 2 is a horizontal longitudinal section of the anode.

Fig. 3 is a vertical longitudinal section of the anode.

The generator of my invention comprises a cathode 2 preferably formed of carbon, and an anode 3 inclosed in a casing 4, so that the arc between the electrodes may be subjected to a hydrogen atmosphere. Arranged on opposite sides of the casing and having their poles 5 extending into the chamber formed thereby are electromagnets 6 which produce a flux in which the arc is formed, the poles being arranged at right angles to the electrodes. The poles are of less diameter than the body of the core lying within the electromagnet winding so that the density of the flux at the poles is increased.

For a given magnetic flux density in an air gap between two poles, the smaller the air gap, the less iron and copper is required in the magnetic circuit. It is therefore advisable to bring the magnetic poles as close together as possible.

When the generator is connected in a radio transmission system, the cathode is connected to earth and the anode to the antenna and they are also connected to the opposite sides of a suitable source of direct current, which produces the arc. A very small potential difference exists between the poles and the cathode, hence there is no tendency for the current to jump from the cathode to the poles and the poles may be placed as close to the cathode as desired. The potential difference between the anode and the poles, however, is relatively high and the poles must be spaced away from the anode a greater distance than the spacing of the cathode and the poles. The anode and cathode must be spaced apart a suitable distance to produce the desired arc.

If the anode and cathode were of the same thickness, this would require that the poles be spaced apart a considerable distance, and in order to maintain the desired flux density, a large amount of copper and iron must be used in the magnetic circuit. In order to overcome this difficulty and to permit a much closer arrangement of the poles, the anode 3 is provided with a tip 7 of much less width than the cathode, so that the distance between the anode and the poles is greater than the distance between the cathode and the poles. The anode is a hollow metallic body, and the anode tip is preferably made of copper, is hollow and is of rectangular cross section. The tip is removably secured to the anode body by a screw cap 8, the joint between the tip and the body being sealed by a metallic gasket 9. During the operation of the generator, sufficient heat is imparted to the anode to rapidly fuse it and to prevent this, a stream of water is introduced into the anode tip through the conduit 12. The water discharges from the conduit against the rear face of the front end of the tip and flows from the tip into the anode body and thence discharges through the conduit 13. For a generator of given capacity, a given amount of water is required to prevent overheating of the anode tip and the tip is made only of sufficient width to permit this quantity of water to be circulated therethrough.

By this construction, the poles may be placed close together and a given magnetic flux density produced with a relatively small amount of copper and iron in the magnetic circuit.

I claim:

1. In an electrical oscillation generator, a cathode, an anode of less width than the cathode, and magnetic poles for producing a magnetic flux in the gap between the anode and cathode, the distance between the anode and the poles being greater than the distance between the cathode and the poles and being greater than the distance from the anode to the cathode.

2. In an electrical oscillation generator, a cathode, an anode of less width than the cathode and magnetic poles for producing a magnetic flux in the gap between the anode and the cathode arranged in close relation to the cathode, the distance between the anode and the poles being greater than the distance between the anode and the cathode.

3. In an electrical oscillation generator, a cathode, an anode of less width than the cathode and magnetic poles for producing a magnetic flux in the gap between the anode and cathode, the distance between the anode and the poles being greater than the distance between the cathode and the poles.

In testimony whereof I have hereunto set my hand at San Francisco, California, this 7th day of July, 1916.

LEONARD F. FULLER.

In presence of—
H. G. PROST.